(12) United States Patent
Jee

(10) Patent No.: US 9,535,554 B2
(45) Date of Patent: Jan. 3, 2017

(54) CAPACITIVE TYPE TOUCH PANEL

(71) Applicant: ABOV SEMICONDUCTOR CO., LTD., Cheongwon-Gun, Chungcheongbuk (KR)

(72) Inventor: Seok Hyun Jee, Incheon (KR)

(73) Assignee: ABOV SEMICONDUCTOR CO., LTD., Cheongwon, Chungcheongbuk-do (KR)

( * ) Notice: Subject to any disclaimer, the term of this patent is extended or adjusted under 35 U.S.C. 154(b) by 0 days.

(21) Appl. No.: 14/881,681

(22) Filed: Oct. 13, 2015

(65) Prior Publication Data

US 2016/0034071 A1 Feb. 4, 2016

Related U.S. Application Data

(63) Continuation of application No. PCT/KR2014/002783, filed on Apr. 1, 2014.

(30) Foreign Application Priority Data

Apr. 10, 2013 (KR) ........................ 10-2013-0038986

(51) Int. Cl.
*G06F 3/044* (2006.01)
*G06F 3/01* (2006.01)

(52) U.S. Cl.
CPC ................ *G06F 3/044* (2013.01); *G06F 3/017* (2013.01); *G06F 2203/04103* (2013.01); *G06F 2203/04111* (2013.01)

(58) Field of Classification Search
CPC G06F 3/044; G06F 3/017; G06F 2203/04111; G06F 2203/04103
See application file for complete search history.

(56) References Cited

U.S. PATENT DOCUMENTS

| 8,159,467 | B2 | 4/2012 | Gray et al. |
| 2010/0001973 | A1 | 1/2010 | Hotelling et al. |
| 2010/0045615 | A1* | 2/2010 | Gray ...................... G06F 3/044 345/173 |

(Continued)

FOREIGN PATENT DOCUMENTS

| JP | 2010-198586 A | 9/2010 |
| JP | 2012-238275 A | 12/2012 |

(Continued)

*Primary Examiner* — Liliana Cerullo
(74) *Attorney, Agent, or Firm* — Mintz Levin Cohn Ferris Glovsky and Popeo, P.C.; Kongsuk Kim; Colleen H. Witherell

(57) ABSTRACT

A capacitive touch panel is disclosed herein. The capacitive touch panel includes a plurality of bottom electrodes formed in a first direction and a plurality of top electrodes formed in a second direction perpendicular to the first direction. Each of the bottom electrodes includes a plurality of first protruding electrodes formed on the first side of the second direction with respect to an imaginary centerline, and formed in an alternately protruding and recessed form along the imaginary centerline, and a plurality of second protruding electrodes formed on a second side of the second direction with respect to the imaginary centerline, formed in an alternately protruding and recessed form along the imaginary centerline, and formed at locations interleaved with respect to those of the first protruding electrodes.

7 Claims, 15 Drawing Sheets

Total R $(R_{B\_PATTERN}) \fallingdotseq (R2/4) + (R2/4) = R2/2$

(56) References Cited

U.S. PATENT DOCUMENTS

| | | |
|---|---|---|
| 2010/0156810 A1 | 6/2010 | Barbier et al. |
| 2010/0238133 A1 | 9/2010 | Wu et al. |
| 2010/0328228 A1 | 12/2010 | Elias |
| 2011/0050631 A1 | 3/2011 | Kwon et al. |
| 2011/0069035 A1 | 3/2011 | Chen et al. |
| 2011/0102370 A1 | 5/2011 | Kono et al. |
| 2012/0132511 A1 | 5/2012 | Tanaka et al. |
| 2012/0162099 A1 | 6/2012 | Yoo et al. |
| 2012/0267228 A1 | 10/2012 | Hong et al. |
| 2013/0207923 A1* | 8/2013 | Mohindra ............... G06F 3/044 345/174 |

FOREIGN PATENT DOCUMENTS

| | | |
|---|---|---|
| KR | 10-2009-0012514 A | 2/2009 |
| KR | 10-2009-0098947 A | 9/2009 |
| KR | 10-1105273 B1 | 1/2012 |
| KR | 10-2012-0119516 A | 10/2012 |

* cited by examiner

Total R ($R_{BAR}$) = R1

Total R ($R_{B\_PATTERN}$) ≒ (R2/4) + (R2/4) = R2/2

CAPACITIVE TYPE TOUCH PANEL

CROSS-REFERENCE TO RELATED APPLICATION

This application is a continuation of PCT/KR2014/002783 filed on Apr. 1, 2014, which claims priority to Korean Application No. 10-2013-0038986 filed on Apr. 10, 2013, which application is incorporated herein by reference.

TECHNICAL FIELD

The present invention relates to a capacitive touch panel and, more particularly, to a capacitive touch panel that can reduce the total resistance value of top transparent electrodes, that can reduce the number of electrode terminals used for the bottom transparent electrodes, and that can provide the accurate coordinate values of a touched location through the guarantee of coordinate linearity.

BACKGROUND ART

Personal computers (PCs), portable transmission devices, and other personal dedicated information processing devices perform text and graphics processing and the like via various input devices, such as a keyboard, a mouse, and a digitizer.

Input devices including only a keyboard and a mouse cannot deal with the extended uses of products, such as PCs, as input devices used for interfaces. Accordingly, there has been a need for an input device that is simpler than a conventional keyboard and mouse, that can reduce erroneous manipulations, that enables anyone to easily perform input operations, and that enables characters to be entered by a hand while it is being carried. In particular, a touch panel is known as an input device that is simple, that reduces erroneous manipulations, that enables anyone to perform input operations while carrying the input device, and that enables characters to be entered without another input device. The detection method, structure and performance thereof are well known.

Such touch panels include: resistive touch panels (screen) in which two sheets having respective resistance components that are disposed such that they are separated by a spacer and are brought into contact with each other by pressing have been combined with each other; capacitance touch panels in which current continuously flows along the surface of a panel and electrons flowing along liquid crystals are attracted to a contact point when a finger or conductor comes into contact with a screen, thereby achieving recognition; Surface Acoustic Wave (SAW) touch panels; optical (infrared) sensor touch panels; and electromagnetic touch panels.

Resistive touch panels are configured in a form in which a plurality of films (screens) is stacked on top of each other on liquid crystals. Resistive touch panels include a film disposed on the outermost side (a portion with which a hand or pen comes into contact) and made of material that is soft and robust to scratches, a film configured to mitigate impacts, and two transparent conductive films (thin transparent conductive substrates) configured to detect input, which are sequentially superimposed on top of each other.

Accordingly, resistive touch panels enable a screen to be touched with not only a finger but also a stylus pen (a touch pen) and almost all objects that can be held in a hand of a user, and are advantageous for successive handwriting inputs or small icon touches. Since the manufacturing costs of resistive touch panels are inexpensive because the principle thereof is simple, resistive touch panels are the most widely applied touch panels. Principal devices employing resistive touch panels include portable game consoles, such as the Nintendo DS, and mobile phones, such as Samsung Anycall Haptic phones and LG Cyon Cooky phones. These devices support handwriting input method-based games, or provide neat user interfaces.

Capacitive touch panels are based on a method using static electricity that is present in the human body. That is, current is made to continuously flow along liquid crystal glass by coating the liquid crystal glass with a conductive compound, and electrons flowing on the liquid crystal glass are attracted to a contact point when a finger comes into contact with a screen. Then, sensors present at corners of the touch screen detect the electrons and thus identify an input.

Accordingly, capacitive touch panels enable touch input to be performed even by slightly grazing a screen (which presents emotional sensations), and support multi-touch functionality (which enables the concurrent recognition of a plurality of contact points). Furthermore, since the liquid crystal glass coated with a dielectric (a conductive compound) is used, there is no concern about a reduction in image quality. Principal devices employing capacitive touch panels include most smart phones that have been recently released. The capacitance input method of capacitive touch panels is appropriate for the application of effective user interfaces to small screens, such as those of the above products. Recently, tablet PCs (such as the Samsung Galaxy Tab, the Apple iPad, etc.) equipped with screens larger than those of mobile phones have attracted attention. Most of these tablet PCs employ capacitance touch screens rather than resistive touch screens.

FIG. 1 is a plan view showing a conventional capacitive touch panel.

As shown in FIG. 1, the conventional capacitive touch panel includes a plurality of bottom transparent electrodes 110, a plurality of top transparent electrodes 120, and electrode terminals 130 and 140 connected to the respective electrodes. It will be apparent that the conventional capacitive touch panel may include components, such as a cover made of tempered glass or reinforced plastic and an optical transparent adhesive, in addition to the components shown in FIG. 1. Since these components are apparent to those skilled in the art, detailed descriptions thereof are omitted.

The plurality of bottom transparent electrodes 110 may be each formed linearly in a first direction, for example, a lateral direction (an x axis direction), and may be formed on a lower transparent substrate (not shown).

In this case, the plurality of bottom transparent electrodes 110 may be disposed at predetermined gaps in a second direction, for example, a vertical direction (a y axis direction).

The plurality of top transparent electrodes 120 is formed in a direction perpendicular to the plurality of bottom transparent electrodes 110. That is, the plurality of top transparent electrodes 120 is formed in the second direction perpendicular to the first direction.

In this case, the plurality of top transparent electrodes 120 may be formed on an upper transparent substrate (not shown).

In the conventional capacitive touch panel configured as described above, a mutual capacitance value is generated between the bottom transparent electrode 110 and the top transparent electrode 120 at each point where the electrodes intersect each other. When the human body comes into contact with or approaches the point, part of the mutual capacitance value generated at the intersection point is transferred to the human body due to the virtual ground phenomenon of the human body. In this case, the mutual capacitance value is reduced at the intersection point, and the recognition of contact with the human body and coordinate calculation are performed based on the change in mutual capacitance.

In the conventional capacitive touch panel, the bottom transparent electrodes 110 are arranged at gaps of about 5 mm based on a diameter ranging from 5 to 6 mm, which corresponds to a human body contact area. The bottom transparent electrodes 110 may be arranged at gaps of a maximum of 6.5 mm based on the material and thickness of the cover.

However, when the number of electrodes or electrode terminals available in the structure of the conventional capacitive touch panel is insufficient, the electrodes are arranged at wider gaps, for example, gaps of 10 mm. In this case, a problem arises in that it becomes difficult to identify contact with the human body, with the result that it becomes difficult to calculate accurate coordinates. That is, the electrode structure of the conventional capacitive touch panel has a problem in that it cannot guarantee coordinate linearity.

Therefore, there is a need for a touch panel that can guarantee coordinate linearity even when the number of available electrodes is insufficient and thus can provide the accurate coordinate values of a touched location.

SUMMARY OF THE DISCLOSURE

Accordingly, the present invention has been made to solve the above problems occurring in the conventional technology, and an object of the present invention is to provide a capacitive touch panel that reduces the total resistance value of top transparent electrodes, thereby enhancing response speed and touch sensitivity.

Another object of the present invention is to provide a capacitive touch panel that can guarantee coordinate linearity even when the number of electrode terminals for bottom transparent electrodes is small and thus can provide the accurate coordinate values of a touched location.

More specifically, the present invention is configured such that top transparent electrodes are each configured in such a manner that electrodes having a predetermined pattern are successively formed and bottom transparent electrodes are each configured to include shapes, for example, protruding electrodes, protruding to left and right sides with respect to a direction, in which the bottom transparent electrode is formed, at predetermined gaps, thereby guaranteeing coordinate linearity even when the number of terminals for the bottom transparent electrodes is small and thus providing the accurate coordinate values of a touched location based on the coordinate linearity.

Still another object of the present invention is to provide a capacitive touch panel that can reduce the number of electrode terminals, thereby reducing the manufacturing costs of products and also improving the manufacturing yield of the products.

In accordance with an aspect of the present invention, there is provided a capacitive touch panel including a plurality of bottom transparent electrodes formed in a first direction and a plurality of top transparent electrodes formed in a second direction perpendicular to the first direction, wherein each of the bottom transparent electrodes includes: a plurality of first protruding electrodes formed on the first side of the second direction with respect to an imaginary centerline formed along the first direction for the corresponding bottom transparent electrode, and formed in an alternately protruding and recessed form along the imaginary centerline in the first direction; and a plurality of second protruding electrodes formed on a second side of the second direction with respect to the imaginary centerline, formed in an alternately protruding and recessed form along the imaginary centerline, and formed at locations interleaved with respect to those of the first protruding electrodes; and wherein each of the top transparent electrodes is formed in such a manner that pattern electrodes having a predetermined pattern are successively formed in the second direction.

The first protruding electrodes may be disposed alternately with the second protruding electrodes of a second bottom transparent electrode neighboring the first side.

The top transparent electrodes may be formed to include patterns corresponding to the shapes of the bottom transparent electrodes.

The top transparent electrodes may be formed in such a manner that reversed B shaped patterns are successively connected in the second direction.

The length to which the first protruding electrodes and the second protruding electrodes are formed in the second direction may be determined by considering at least one of the sensitivity of the touch panel, the shape of the patterns of the top transparent electrodes, and the number of terminals for the bottom transparent electrodes.

Each of the bottom transparent electrodes may further include a linear electrode that has a predetermined width, that is linearly formed in the first direction, and that is formed such that the first protruding electrodes are formed on the first side and the second protruding electrodes are formed on the second side.

In accordance with another aspect of the present invention, there is provided a capacitive touch panel including a plurality of bottom transparent electrodes formed in a first direction and a plurality of top transparent electrodes formed in a second direction perpendicular to the first direction, wherein each of the bottom transparent electrodes includes: a linear electrode configured to have a predetermined width, and linearly formed in the first direction; a plurality of first protruding electrodes formed on the first side of the second direction with respect to the linear electrode, and formed in an alternately protruding and recessed form along the linear electrode; and a plurality of second protruding electrodes formed on the second side of the second direction with respect to the linear electrode, formed in an alternately protruding and recessed form along the linear electrode, and formed to be symmetrical to the first protruding electrodes with respect to the linear electrode; and wherein each of the top transparent electrodes is formed in such a manner that pattern electrodes having a predetermined pattern are successively formed in the second direction.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Embodiments of the present invention will be described in detail with reference to the accompanying drawings. In the following description of the present invention, detailed descriptions of related well-known components or functions that may unnecessarily make the gist of the present invention obscure will be omitted.

The prevent invention is not limited to the embodiments. Throughout the accompanying drawings, the same reference symbols are assigned to the same components.

A capacitive touch panel according to an embodiment of the present invention is described in detail below with reference to FIGS. 2 to 11.

The gist of the present invention resides in providing coordinate linearity even when the number of electrodes is small and thus providing the accurate coordinate values of a touched location, and also resides in reducing the total resistance value of electrodes, increasing a change in mutual capacitance attributable to a touch and thus improving response speed and touch sensitivity.

For convenience of description of the present invention, top transparent electrodes and bottom transparent electrodes are illustrated as having been rotated by 90° in a clockwise direction in FIGS. 4 to 11. Descriptions thereof will be given using the diagrams in the state of having been rotated by 90°.

Figure 1:
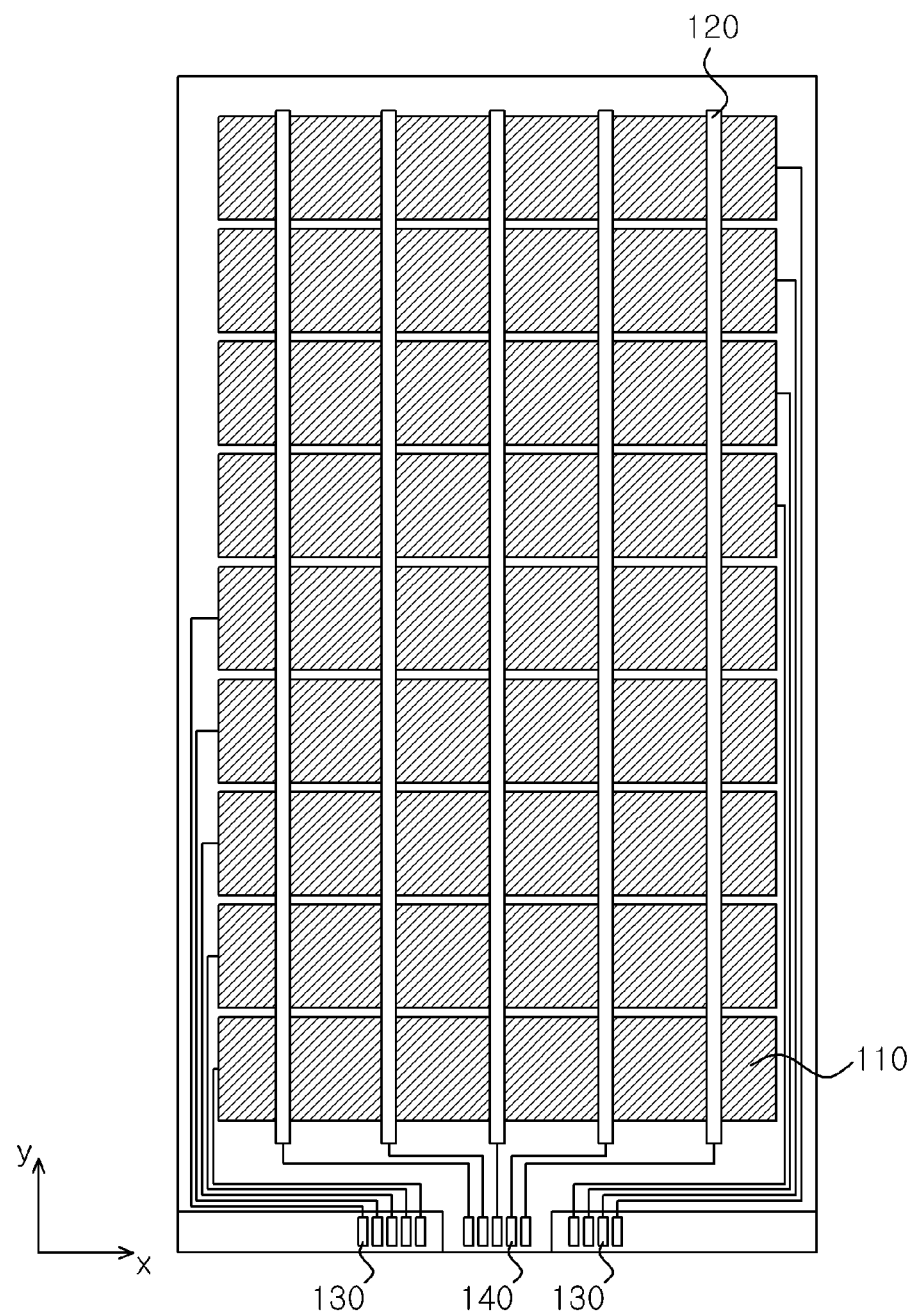
FIG. 1 is a plan view showing a conventional capacitive touch panel.
Figure 2:
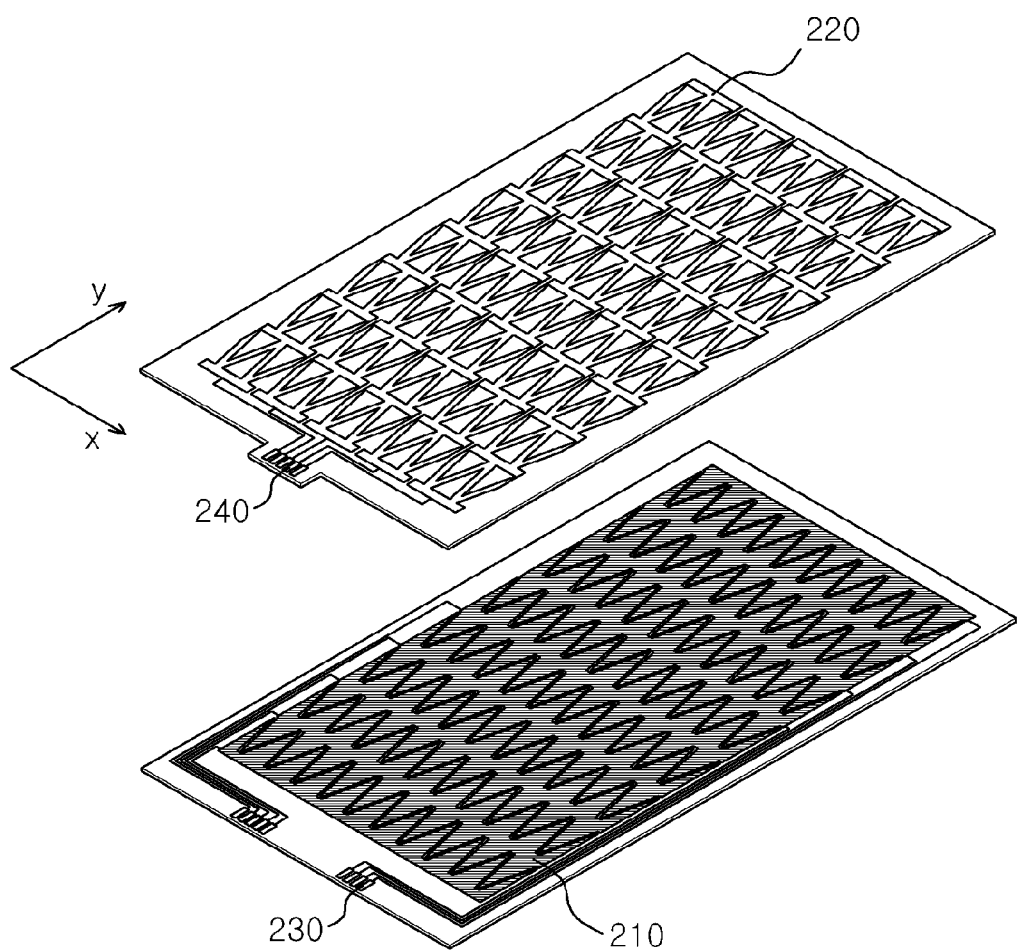
FIG. 2 is a perspective view showing a capacitive touch panel according to an embodiment of the present invention.
Figure 3:
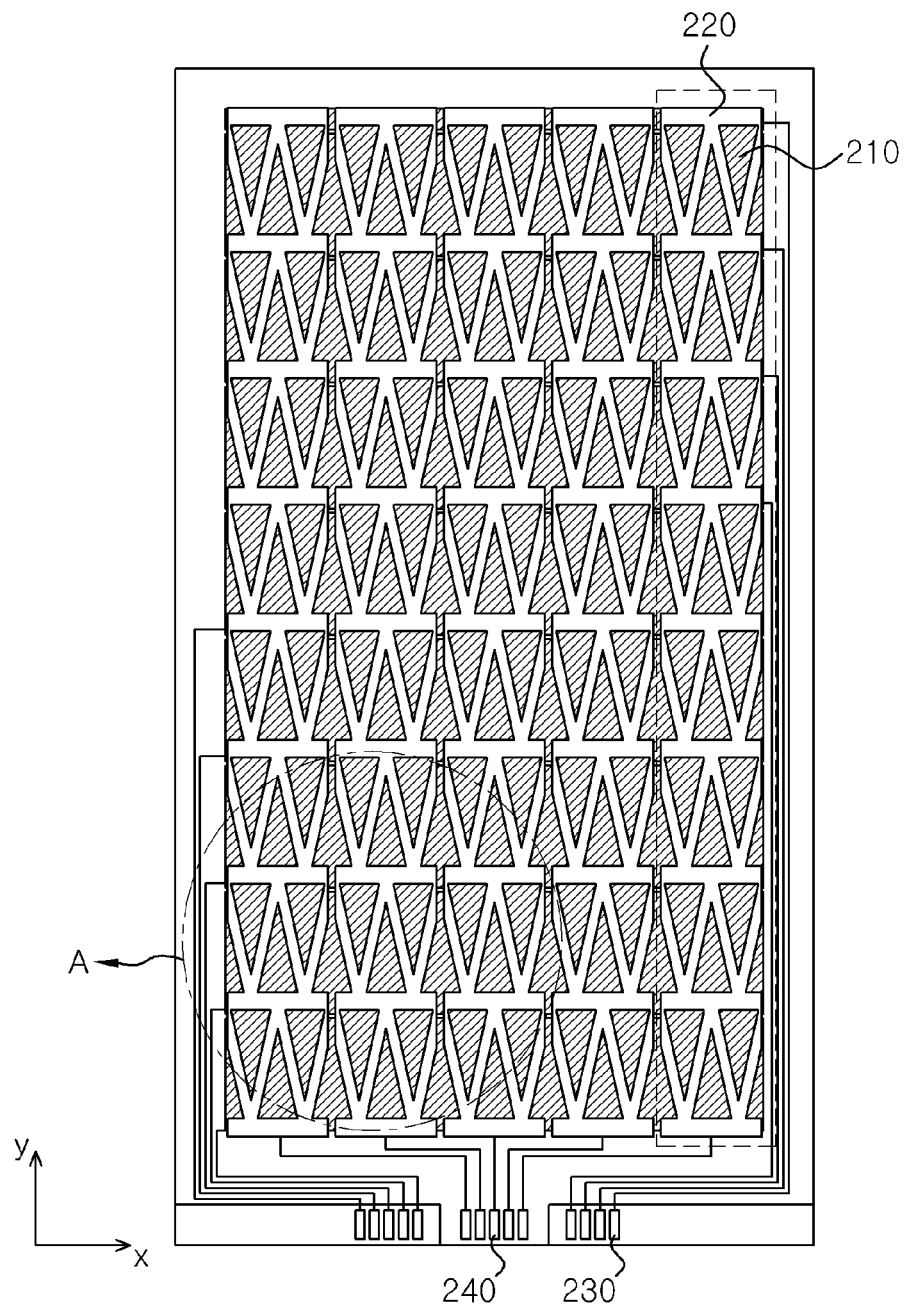
FIG. 3 is a plan view showing a capacitive touch panel according to an embodiment of the present invention.

FIG. 2 is a perspective view showing a capacitive touch panel according to an embodiment of the present invention, and FIG. 3 is a plan view showing a capacitive touch panel according to an embodiment of the present invention.

Referring to FIGS. 2 and 3, the capacitive touch panel according to the present embodiment includes a plurality of bottom transparent electrodes 210, a plurality of top transparent electrodes 220, and electrode terminals 230 and 240 connected to the respective electrodes 210 and 220.

The plurality of bottom transparent electrodes 210 is formed in a first direction, for example, a lateral direction (an x axis direction), and may be disposed at predetermined gaps in a second direction, for example, a vertical direction (a y axis direction).

The plurality of bottom transparent electrodes 210 functions to prevent electromagnetic waves (noise) from being transferred to the top transparent electrodes 220 by blocking electromagnetic waves radiated by a display screen that is present below the bottom transparent electrodes 210.

In this case, the plurality of bottom transparent electrodes 210 may be formed on a lower transparent substrate (not shown).

The plurality of bottom transparent electrodes 210 is electrically connected to the predetermined terminals 230 for bottom transparent electrodes, and may be connected to a control module (not shown) for detecting touched coordinate locations via the terminals 230 for bottom transparent electrodes.

The present invention is intended to provide coordinate linearity even when the number of terminals 230 for bottom transparent electrodes is small and accurately detect touched coordinate locations based on the coordinate linearity. The configuration of the bottom transparent electrodes is described with reference to FIGS. 4A and 4B below.

Figure 4A:
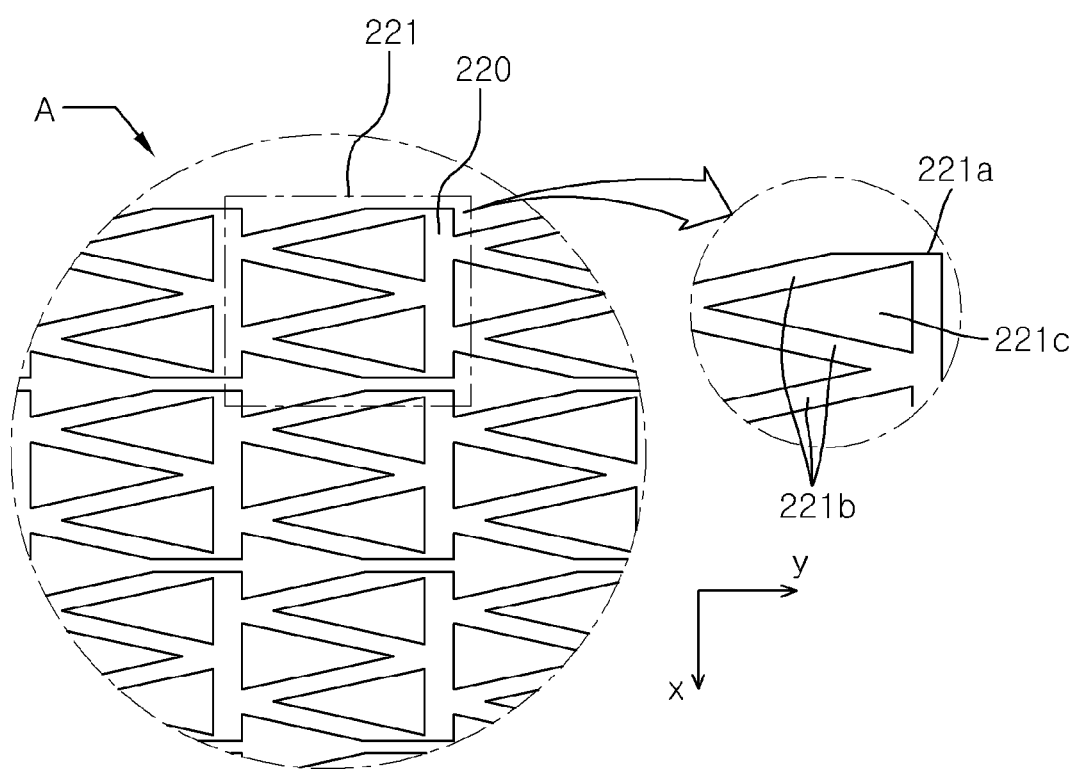
FIGS. 4A and 4B are plan views showing top transparent electrodes and bottom transparent electrodes in region "A" shown in FIG. 3, respectively.
Figure 4B:
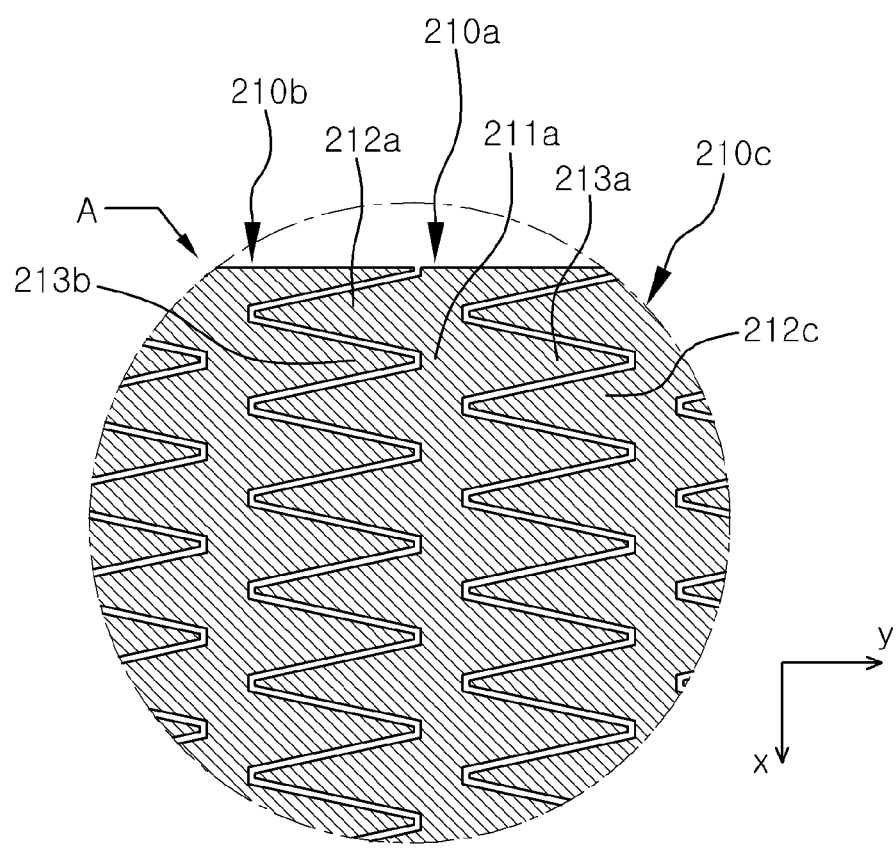

As shown in FIG. 4B, a first bottom transparent electrode 210a includes: a linear electrode 211a linearly formed along an x axis; a plurality of first protruding electrodes 212a configured such that a plurality of shapes, for example, wedges (or spurs), protruding from the linear electrode 211a to a first side along a y axis is successively formed at predetermined gaps in an alternately protruding and recessed form; and a plurality of second protruding electrodes 213a configured such that a plurality of wedges protruding from the linear electrode 211a to a second alternately protruding and recessed along the y axis are successively formed at predetermined gaps in an alternately protruding and recessed form.

In this case, the plurality of first protruding electrodes 212a and the plurality of second protruding electrodes 213a may be formed at interleaved locations on respective sides of the linear electrode 211a. The length, to which the first protruding electrodes 212a and second protruding electrodes 213a of the first bottom transparent electrode 210a protrude from the linear electrode 211a, and the pitch between wedges, which are defined by the first protruding electrodes 212a and the second protruding electrodes 213a, may be determined by considering at least one of the sensitivity of the touch panel, the shape of the pattern of the top transparent electrodes, and the number of terminals for the bottom transparent electrodes.

Furthermore, the first protruding electrodes 212a are disposed alternately with the second protruding electrodes 213b of a second bottom transparent electrode 210b neighboring the first side, and the second protruding electrodes 213a are disposed alternately with the first protruding electrodes 212c of a third bottom transparent electrode 210c neighboring the second side.

Moreover, the outermost bottom transparent electrodes of the bottom transparent electrodes according to the present embodiment may be formed in different shapes that fit regions where the electrodes are formed, as shown in FIG. 2.

The plurality of top transparent electrodes 220 is formed in a direction perpendicular to the bottom transparent electrodes 210. That is, the plurality of top transparent electrodes 220 is formed in the second direction, for example, the vertical direction (the y axis direction), perpendicular to the first direction in which the bottom transparent electrodes 220 are formed. Alternatively, the plurality of top transparent electrodes 220 may be disposed in the y axis direction at predetermined gaps with respect to the first direction, for example, the lateral direction (the x axis direction).

The top transparent electrodes 220 are configured to be spaced apart from the bottom transparent electrodes 210 by a predetermined gap, and are electrically connected to the predetermined terminals 240 for top transparent electrodes.

In the same manner, the plurality of top transparent electrodes 220 may be connected to the control module for detecting touched coordinate locations via the predetermined terminals 240 for top transparent electrodes.

In this case, the plurality of top transparent electrodes 220 may be formed on an upper transparent substrate (not shown).

Each of the plurality of top transparent electrodes 220 is formed in such a manner that pattern electrodes having a predetermined pattern are successively connected in the second direction (the vertical direction). For example, each of the plurality of top transparent electrodes 220 is formed in such a manner that pattern electrodes 221 having a reversed B shaped pattern are successively connected, as shown in an example of FIG. 4A. It will be apparent that the pattern of the pattern electrodes 221 is not limited to the reversed B shaped pattern but may include all patterns applicable to the present invention. As shown in FIG. 4A, each of the pattern electrodes 221 includes a first pattern electrode 221a formed in the first direction, and a second pattern electrode 221b configured to connect the first pattern electrode 221a and another neighboring first pattern electrode 221a in a zigzag form. Space 221c are formed between the first pattern electrode 221a and the second pattern electrode 221b.

Figure 5A:
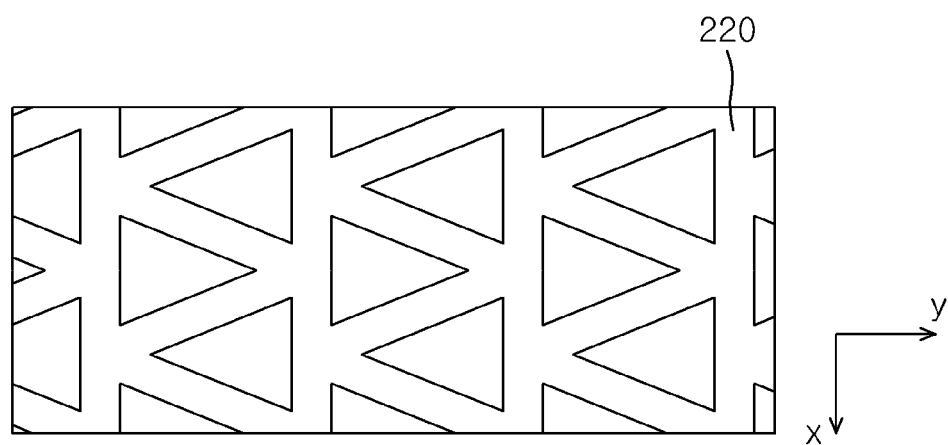
FIGS. 5A, 5B and 5C are diagrams showing the transparent electrodes of a capacitive touch panel according to an embodiment of the present invention.
Figure 5B:
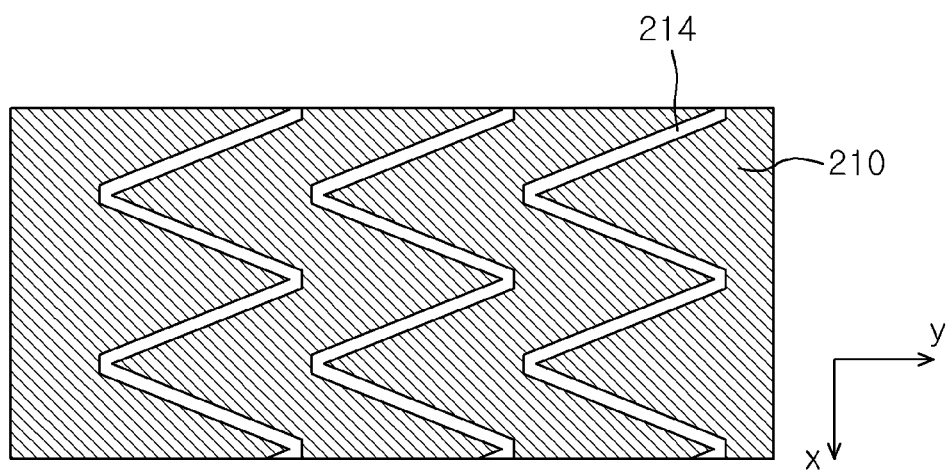
Figure 5C:
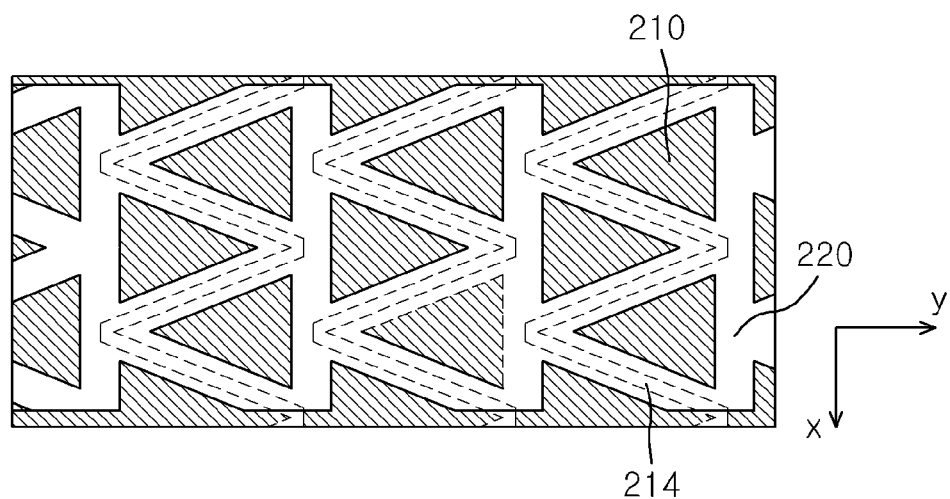
Figure 6A:
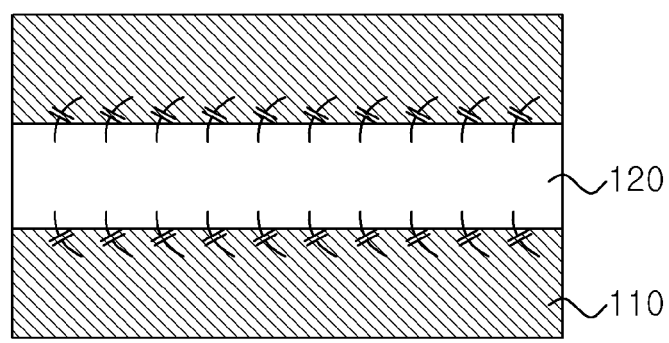
FIGS. 6A, 6B, 7A and 7B show plan and sectional views illustrating mutual capacitance values in a conventional touch panel and a touch panel according to the present invention.
Figure 6B:
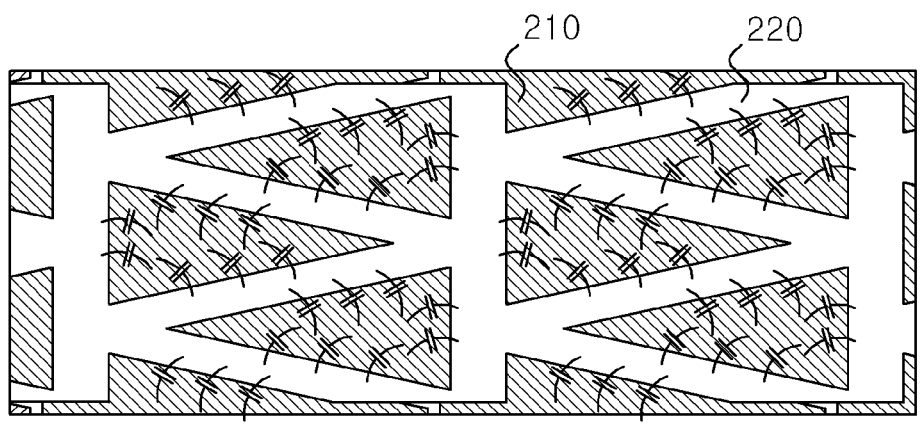
Figure 7A:
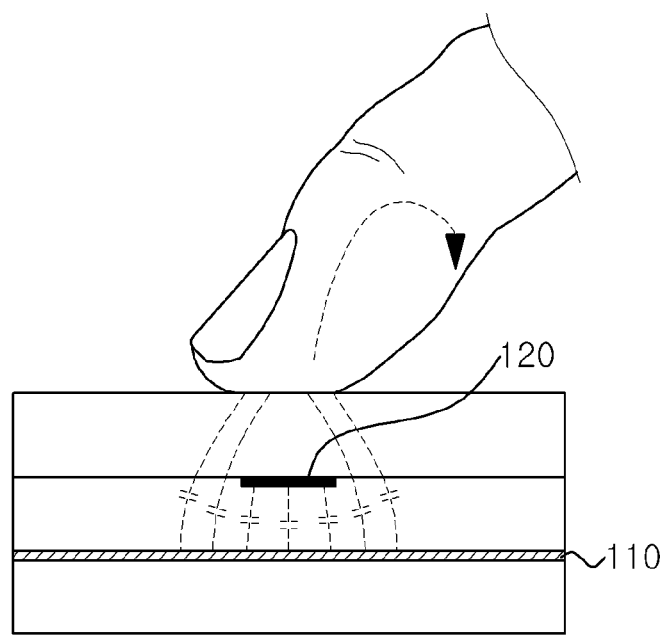
Figure 7B:
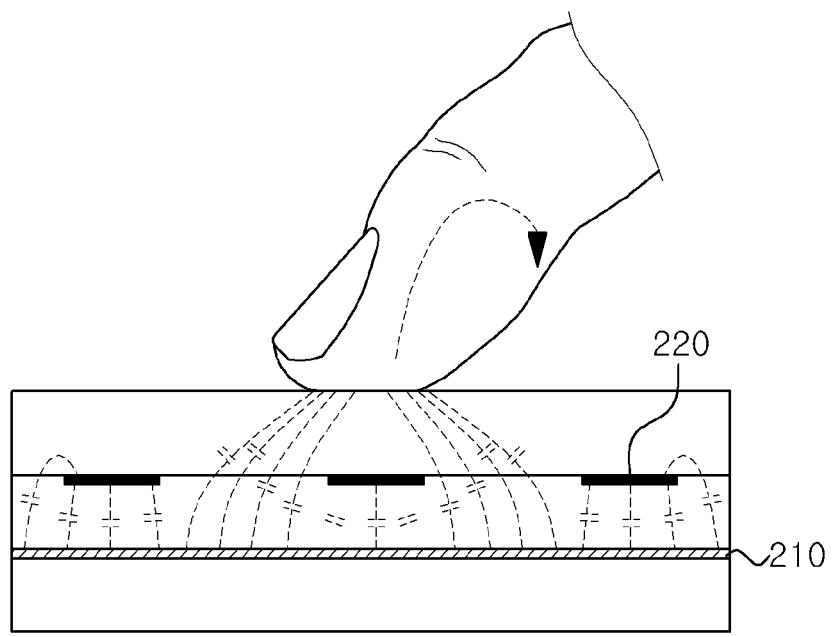

In this case, the top transparent electrodes 220 may be formed to include patterns corresponding to the shapes of the bottom transparent electrodes 210. For example, as shown in FIGS. 5A, 5B and 5C, the top transparent electrodes 220 include second pattern electrodes 221b as patterns corresponding to the alternately protruding and recessed shapes of the bottom transparent electrodes 210. The top transparent electrodes 220 and the bottom transparent electrodes 210 may be formed such that the second electrode patterns 221b of the top transparent electrodes 220 cover gaps 214 between the alternately protruding and recessed shapes of the bottom transparent electrodes 210, for example, gaps between the first protruding electrodes 212a and the second protruding electrodes 213b shown in FIG. 4B, and the gaps 214 between the alternately protruding and recessed shapes of the bottom transparent electrodes 210 overlap the second electrode patterns 221b of the top transparent electrodes 220. In this case, the sizes of the pattern electrodes of the top transparent electrode 210 may vary depending on the shape in which the bottom transparent electrodes 210 protrude and the length to which the bottom transparent electrodes 210 extend in the second direction (the lateral direction in the drawing). As shown in FIG. 5C, at least parts of the protruding electrodes 212 and 213 of the bottom transparent electrodes 210 are exposed through the space 221c of the top transparent electrodes 220.

Moreover, the pattern of the top transparent electrodes 220 may be determined by additionally considering the total resistance value of the electrodes, sensitivity, and the like.

As described above, in the capacitive touch panel according to the present invention, the top transparent electrodes are formed in such a manner that predetermined patterns, for example, reversed B shaped patterns, corresponding to the shapes of the bottom transparent electrodes are successively connected, and the bottom transparent electrodes are formed in such a manner that protruding electrodes formed on left and right sides with respect to a direction, in which each of the bottom transparent electrodes is formed, at predetermined gaps are included and are disposed alternately with the protruding electrodes of a neighboring bottom transparent electrode. As a result, sensitivity is enhanced, and coordinate linearity can be provided even when the number of bottom transparent electrodes is small, thereby providing the accurate coordinate values of a touched portion.

Moreover, the present invention can reduce the number of electrode terminals, thereby reducing the manufacturing costs of products and also increasing the manufacturing yield of the products.

FIGS. 6A, 6B, 7A and 7B show plan and sectional views illustrating mutual capacitance values in a conventional touch panel and a touch panel according to the present invention.

As shown in FIGS. 6A, 6B, 7A and 7B, in the conventional capacitive touch panel, only a mutual capacitance value is generated between a bottom transparent electrode 110 and an top transparent electrode 120 that are linearly formed, and part of the mutual capacitance value is transferred to the human body via a hand of a user during contract with the human body. The conventional capacitive touch panel has the problem of poor sensitivity because a change in mutual capacitance is small during a touch.

In contrast, in the capacitive touch panel of the present invention, many high mutual capacitance values are generated between a bottom transparent electrode 210 and an top transparent electrode 220 compared to that of the conventional touch panel. That is, mutual capacitance values are generated between the pattern electrodes 221 of the top transparent electrodes 220 and the electrodes (for example, first protruding electrodes 212, second protruding electrodes 213 and linear electrodes 211) of the bottom transparent electrodes 210, and thus many mutual capacitance values are generated.

Accordingly, a change in mutual capacitance transferred to the human body via a hand of a user during contact with the human body of the user is large and thus sensitivity is enhanced, thereby providing the advantage of easily calculating the coordinate values of a touched portion.

Figure 8A:
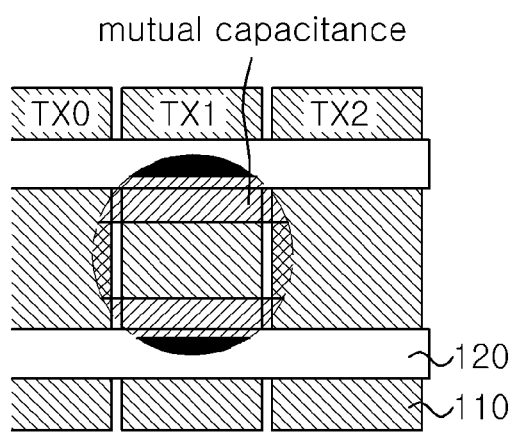
FIGS. 8A, 8B, and 8C show plan views illustrating coordinate linearity in a conventional touch panel and a touch panel according to the present invention.
Figure 8B:
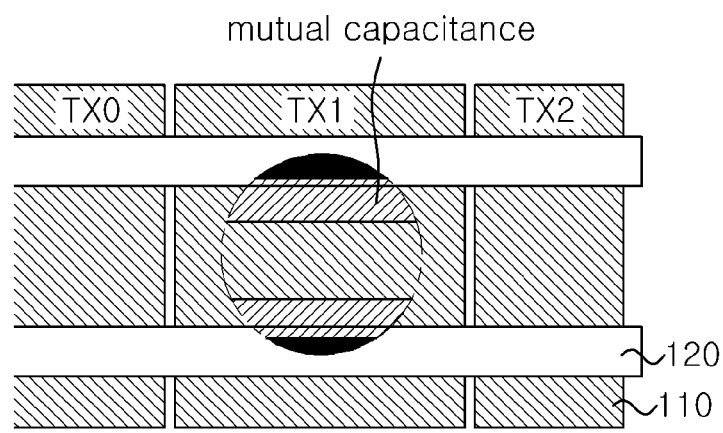
Figure 8C:
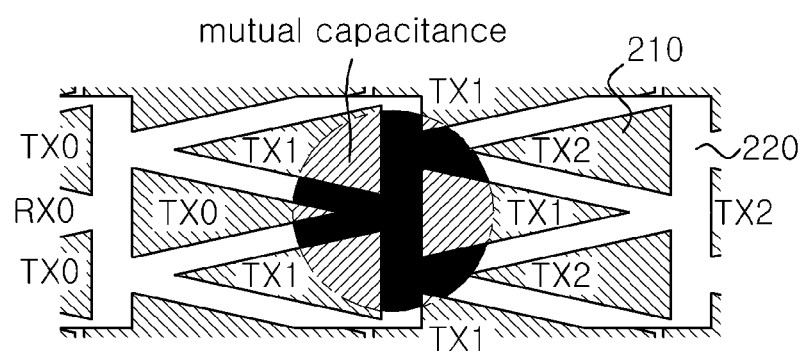

FIGS. 8A, 8B and 8C show plan views illustrating coordinate linearity in a conventional touch panel and a touch panel according to the present invention. FIG. 8C shows an effective touch area and a mutual capacitance phenomenon during contact with the human body.

As shown in FIG. 8A, when the gaps between linearly formed bottom transparent electrodes 110 are narrow, two top transparent electrodes 120 and three bottom transparent electrode TXO to TX2 are brought into contact by the human body of a user, and thus a change in mutual capacitance between the electrodes is generated in the three bottom transparent electrode TXO to TX2. However, in the case of FIG. 8A, the gaps between the bottom transparent electrodes 110 must be formed to be narrow, and thus the number of terminals for connection to a control module must be large, thereby resulting in an increase in manufacturing costs.

FIG. 8B shows a case where the gaps between bottom transparent electrodes 110 are formed to be wider than those of FIG. 8A. As shown in FIG. 8B, the gaps between the bottom transparent electrodes 110 are formed to be wide, and thus only a mutual capacitance value generated between two top transparent electrode 120 and a single bottom transparent electrode TX1 is influenced by the human body of a user. In this case, coordinate linearity is degraded, and thus a problem arises in that it is difficult to calculate the coordinates of a touched portion. That is, a problem arises in that sensitivity is low.

In contrast, in the case of the present invention shown in FIG. 8C, even when the gaps at which bottom transparent electrodes 210 are disposed are wide, a change in mutual capacitance equal to or larger than a predetermined value is generated between three bottom transparent electrodes TXO to TX2 and an top transparent electrode 220 by the alternately disposed protruding electrodes of the bottom transparent electrodes TXO to TX2 in response to a touch of a user. Accordingly, even when the number of terminals for the bottom transparent electrodes 210 is small, the accurate coordinates of a touched portion can be calculated. That is, the present invention employs the top transparent electrodes formed in a predetermined pattern and the alternately disposed protruding electrodes of neighboring bottom transparent electrodes, thereby providing coordinate linearity even when the number of electrode terminals for the bottom transparent electrodes is small and thus providing the accurate coordinate values of a touched portion based on the coordinate linearity. As described above, the bottom transparent electrodes according to the present invention are configured in the form of alternately protruding and recessed electrodes including protrusions, and thus enhance sensitivity and provide coordinate linearity, thereby more easily and accurately calculating the coordinate values of a touched portion.

Figure 9A:
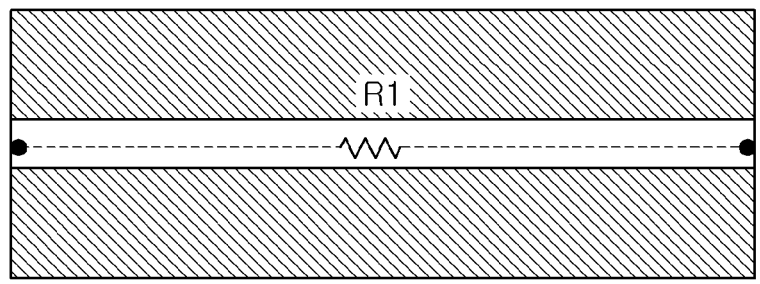
FIGS. 9A and 9B show a plan view and an equivalent resistance model illustrating electrode resistance values in a conventional touch panel and a touch panel according to the present invention.
Figure 9B:
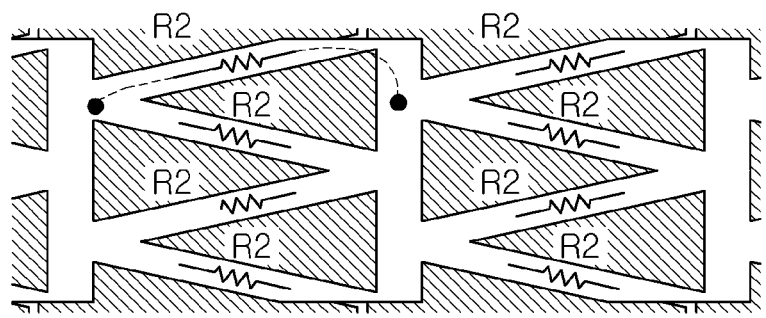

FIGS. 9A and 9B show a plan view and an equivalent resistance model illustrating electrode resistance values in a conventional touch panel and a touch panel according to the present invention.

As shown in FIG. 9A, in the case of the conventional touch panel, an top transparent electrode is composed of a single linear electrode, and thus the total resistance value $R_{BAR}$ of the top transparent electrode is R1.

In contrast, as shown in FIG. 9B, the case of the touch panel according to the present invention can reduce a total resistance value compared to the conventional touch panel because a total resistance value $R_{B\_PATTERN}$ generated by the predetermined pattern, for example, reverse B shaped pattern, of the top transparent electrodes is R2/2.

As an example, in the case of an ITO sheet resistance of 270 ohm/square, with respect to a length of 10 mm, the total resistance value $R_{BAR}$ of a conventional touch panel is 2.3 kohm, whereas the total resistance value $R_{B\_PATTERN}$ of the present invention is about 850 ohm. The present invention achieves the effect of reducing its total resistance value to about ⅓ of the total resistance value of the conventional touch panel. It will be apparent that the total resistance value according to the present invention may vary depending on the dimensions of the pattern.

Accordingly, according to the present invention, the total resistance value of top transparent electrodes is reduced, which can increase the speed of response to a touch.

Figure 10:
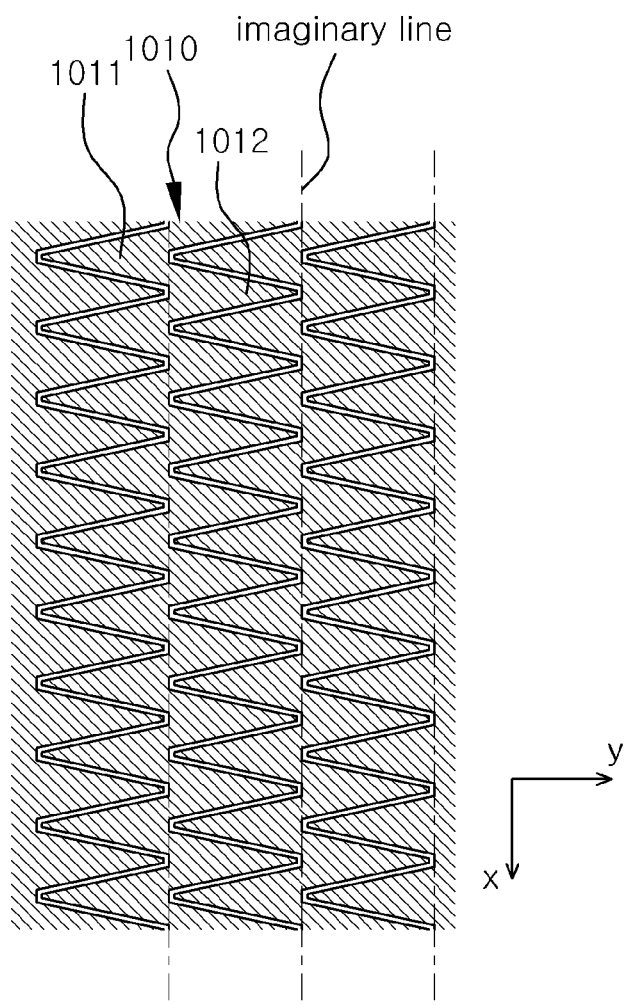
FIGS. 10 to 11 show the configurations of top transparent electrodes in capacitive touch panels according to embodiments of the present invention.

FIG. 10 shows the configuration of bottom transparent electrodes in a capacitive touch panel according to another embodiment the present invention. FIG. 10 shows the configuration of a case where linear electrodes are not included in the bottom transparent electrodes.

As shown in FIG. 10, a bottom transparent electrode 1010 is formed such that first protruding electrodes 1011 are formed on the first side (in this case, the left side) of an imaginary line with respect to the imaginary line of the corresponding bottom transparent electrode and second protruding electrodes 1012 are formed on the second side (in this case, the right side) of the imaginary line.

The first protruding electrodes 1011 and the second protruding electrodes 1012 are formed at interleaved locations, and are formed to be disposed alternately with the second protruding electrodes of a neighboring bottom transparent electrode.

Although the length of the protruding electrodes of the bottom transparent electrode has been illustrated as being formed to be shorter than the length between imaginary lines in FIG. 10, the length of the protruding electrodes of the bottom transparent electrode is not limited thereto, but may be formed to be longer than the length between the imaginary lines. It will be apparent that in such a case, the gaps at which the protruding electrodes are formed may be determined based on the length of the protruding electrodes. Referring to FIGS. 4 and 10 together, the first pattern electrodes 221a of the top transparent electrodes are formed along the imaginary centerlines.

Figure 11:
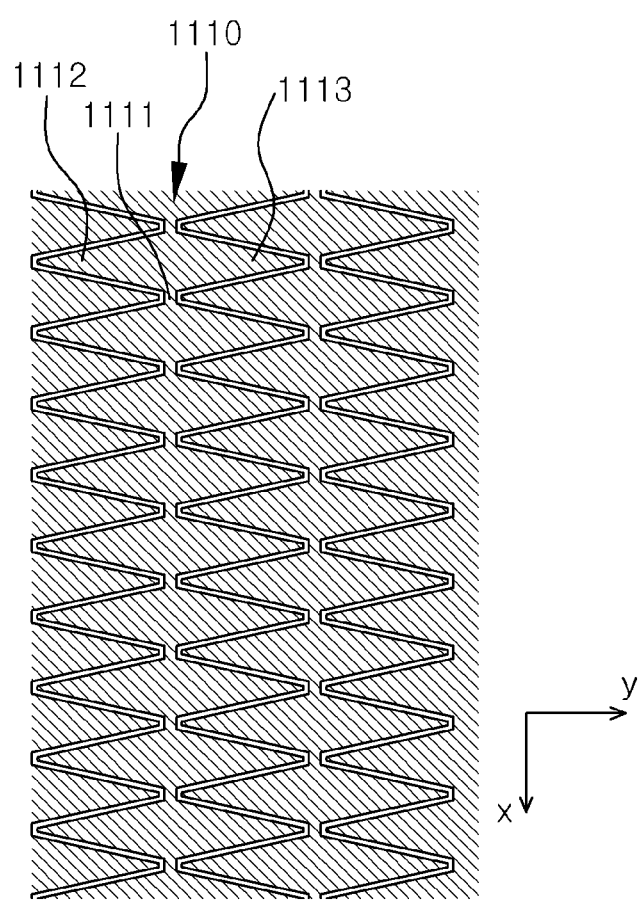

FIG. 11 shows the configuration of bottom transparent electrodes in a capacitive touch panel according to another embodiment the present invention. FIG. 11 shows a configuration in which first protruding electrodes and second protruding electrodes are formed to be symmetrical with respect to each linear electrode.

Referring to FIG. 11, each of the bottom transparent electrodes 1110 includes: a linear electrode 1111 configured to have a predetermined width, and linearly formed in a vertical direction; a plurality of first protruding electrodes 1112 formed on the first side (left side) of the linear electrode 1111 with respect to a lateral direction, and formed in an alternately protruding and recessed form in the vertical direction; and a plurality of second protruding electrodes 1113 formed on the second side (right side) of the linear electrode 1111 with respect to the lateral direction, formed in an alternately protruding and recessed form in the vertical direction, and formed to be symmetrical to the first protruding electrodes 1112 with respect to the linear electrode 1111.

In this case, the first protruding electrodes 1112 are formed to be disposed alternately with the second protruding electrodes of a neighboring bottom transparent electrode, and similarly the second protruding electrodes 1113 are formed to be disposed alternately with the first protruding electrodes of a neighboring bottom transparent electrode, as described above.

According to the present invention, each top transparent electrode is configured such that predetermined patterns are successively formed, thereby improving response speed through a reduction in the total resistance value of top transparent electrodes and also enhancing touch sensitivity through an increase in a mutual capacitance change attributable to a touch.

Furthermore, the present invention is configured such that the protruding electrodes of each bottom transparent electrode are formed to be arranged alternately with those of a neighboring bottom transparent electrode, and thus can guarantee coordinate linearity even when the number of electrode terminals is small, thereby providing the accurate coordinate values of a touched location.

Moreover, the present invention can reduce the number of electrode terminals, and thus can reduce the number of ports connected to bottom transparent electrodes in a control module for detecting touch coordinates, such as a microcontroller (MCU), thereby reducing the manufacturing costs of products and also improving the manufacturing yield of the products through a reduction in defect rate.

While the present invention has been described in conjunction with specific details, such as specific configuration elements, and limited embodiments and diagrams above, these are provided merely to help an overall understanding of the present invention, the present invention is not limited to these embodiments, and various modifications and variations can be made based on the above description by those having ordinary knowledge in the art to which the present invention pertains.

Therefore, the technical spirit of the present invention should not be determined based on only the described embodiments, and the following claims, all equivalents to the claims, and equivalent modifications should be construed as falling within the scope of the spirit of the present invention.

What is claimed is:

1. A capacitive touch panel comprising a plurality of bottom transparent electrodes formed in a first direction and a plurality of top transparent electrodes formed in a second direction perpendicular to the first direction,
wherein each of the bottom transparent electrodes comprises:
a plurality of first protruding electrodes formed on a first side of the second direction with respect to an imaginary line formed along the first direction for the corresponding bottom transparent electrode, and formed in an alternately protruding and recessed form along the imaginary line in the first direction; and
a plurality of second protruding electrodes formed on a second side of the second direction with respect to the imaginary line, formed in an alternately protruding and recessed form along the imaginary line in the first direction, and formed at locations interleaved with respect to those of the first protruding electrodes; and
wherein each of the top transparent electrodes is formed in such a manner that pattern electrodes having a predetermined pattern are successively formed in the second direction, and the pattern electrodes are formed to cover gaps between neighboring first protruding electrodes and second protruding electrodes of the bottom transparent electrodes,
wherein each of the pattern electrodes comprises:
a first pattern electrode configured to correspond to the imaginary line along the first direction for the bottom transparent electrode; and
a second pattern electrode configured to connect the first pattern electrode and its neighboring first pattern electrode in a zigzag form, and formed to cover gaps between neighboring first protruding electrodes and second protruding electrodes of the bottom transparent electrodes, and
wherein at least parts of the plurality of first protruding electrodes and plurality of second protruding electrodes of each of the bottom transparent electrodes are exposed through space between the first pattern electrode and the second pattern electrode.

2. The capacitive touch panel of claim 1, wherein the first protruding electrodes are disposed alternately with second protruding electrodes of a second bottom transparent electrode neighboring the first side of the bottom transparent electrode.

3. The capacitive touch panel of claim 1, wherein the top transparent electrodes are formed in such a manner that reversed B shaped patterns are successively connected in the second direction.

4. The capacitive touch panel of claim 1, wherein a length to which the first protruding electrodes and the second protruding electrodes are formed in the second direction is determined by considering at least one of sensitivity of the touch panel, a shape of the patterns of the top transparent electrodes, and a number of terminals for the bottom transparent electrodes.

5. The capacitive touch panel of claim 1, wherein each of the bottom transparent electrodes further comprises a linear electrode that has a predetermined width, that is linearly formed in the first direction, and that is formed such that the first protruding electrodes are formed on the first side and the second protruding electrodes are formed on the second side thereof.

6. A capacitive touch panel comprising a plurality of bottom transparent electrodes formed in a first direction and a plurality of top transparent electrodes formed in a second direction perpendicular to the first direction,
wherein each of the bottom transparent electrodes comprises:
a linear electrode configured to have a predetermined width, and linearly formed in the first direction;
a plurality of first protruding electrodes formed on a first side of the second direction with respect to the linear electrode, and formed in an alternately protruding and recessed form along the linear electrode in the first direction; and
a plurality of second protruding electrodes formed on a second side of the second direction with respect to the linear electrode, formed in an alternately protruding and recessed form along the linear electrode in the first direction, and formed to be symmetrical to the first protruding electrodes with respect to the linear electrode; and
wherein each of the top transparent electrodes is formed in such a manner that pattern electrodes having a predetermined pattern are successively formed in the second direction, and the pattern electrodes are formed to cover gaps between neighboring first protruding electrodes and second protruding electrodes of the bottom transparent electrodes,
wherein each of the pattern electrodes comprises:
a first pattern electrode configured to correspond to the imaginary line along the first direction for the bottom transparent electrode; and
a second pattern electrode configured to connect the first pattern electrode and its neighboring first pattern electrode in a zigzag form, and formed to cover gaps between neighboring first protruding electrodes and second protruding electrodes of the bottom transparent electrodes, and
wherein at least parts of the plurality of first protruding electrodes and plurality of second protruding electrodes of each of the bottom transparent electrodes are exposed through space between the first pattern electrode and the second pattern electrode.

7. The capacitive touch panel of claim 6, wherein the first protruding electrodes are disposed alternately with second protruding electrodes of a second bottom transparent electrode neighboring the first side.

* * * * *